(12) United States Patent
Fraser et al.

(10) Patent No.: US 6,935,494 B2
(45) Date of Patent: Aug. 30, 2005

(54) CONTAINER WITH INFORMATION DISPLAY

(75) Inventors: Anthony Henry Joseph Fraser, Northants (GB); Stefan Alexander Pijanowski, Northants (GB)

(73) Assignee: Dubois, Ltd., Corby (GB)

( * ) Notice: Subject to any disclaimer, the term of this patent is extended or adjusted under 35 U.S.C. 154(b) by 284 days.

(21) Appl. No.: 10/160,677

(22) Filed: Sep. 5, 2002

(65) Prior Publication Data

US 2004/0045845 A1 Mar. 11, 2004

Related U.S. Application Data

(63) Continuation of application No. PCT/GB00/04677, filed on Dec. 6, 2000.

(30) Foreign Application Priority Data

Dec. 6, 1999 (GB) .............................................. 9928721
Jul. 26, 2000 (GB) .............................................. 0018291

(51) Int. Cl.⁷ ............................................ B65D 85/57
(52) U.S. Cl. .................. 206/312; 206/387.13; 206/472
(58) Field of Search .............................. 206/307, 308.1, 206/309–312, 387.1–387.13, 232, 484.2, 472, 475; 156/238, 290, 358

(56) References Cited

U.S. PATENT DOCUMENTS

| | | | | |
|---|---|---|---|---|
| 4,407,410 A | * | 10/1983 | Graetz et al. ........... | 206/387.13 |
| 4,717,021 A | * | 1/1988 | Ditzig .................... | 206/387.13 |
| 4,771,886 A | * | 9/1988 | Johnson ................. | 206/387.13 |
| 4,784,264 A | * | 11/1988 | Sykes ..................... | 206/387.13 |
| 4,966,283 A | * | 10/1990 | Sykes et al. ........... | 206/387.13 |
| 5,657,867 A | * | 8/1997 | Fu et al. .................. | 206/308.1 |
| 6,030,474 A | | 2/2000 | Isono et al. | |
| 6,367,623 B1 | * | 4/2002 | Tully et al. ................. | 206/232 |

FOREIGN PATENT DOCUMENTS

| | | |
|---|---|---|
| CH | 675 173 A | 8/1990 |
| DE | 33 25 394 A | 1/1985 |
| EP | 0 840 322 A | 5/1998 |
| FR | 2 518 297 | 6/1983 |
| FR | 2 586 498 | 2/1987 |
| GB | 2 091 692 A | 8/1982 |
| GB | 2 232 405 A | 12/1990 |
| JP | 10 071789 A | 3/1998 |

* cited by examiner

*Primary Examiner*—Luan K. Bui

(57) ABSTRACT

A container such as a CD or DVD box with a body portion having two sections (1, 2) connected to each other by a hinge portion (3) and an information display member or label (4) which includes an information layer formed as a part of the member (4) is secured by an adhesive or welded bond to one section (1) of the body portion. The information display member (4) extends across the hinge portion (3), with at least the majority thereof being unsecured to the hinge portion (3). and is secured by an adhesive or welded bond to the second section (2) of the body portion.

17 Claims, 5 Drawing Sheets

CONTAINER WITH INFORMATION DISPLAY

This application is a continuation of prior PCT Application No. PCT/GB00/04677, filed Dec. 6, 2000.

TECHNICAL FIELD

The present invention relates to a container with an information display, and more particularly, but not restricted to, a container for a video cassette, a compact disk (CD), digital versatile disk (DVD) or other electronic media. In particular, the present invention relates to a container that incorporates printed matter, whether to provide the consumer with promotional, instructional or other related information.

BACKGROUND ART

Previously, conventional containers for video cassettes etc. have used a plastics sleeve welded at opposite edges thereof to the exterior surfaces of the container, the sleeve being adapted to hold a paper insert printed with the required information between itself and the external walls of the container. However, the insert often slips either totally out of the sleeve and is therefore lost, or slips partially relative to the sleeve and consequently becomes crumpled and damaged so that not all information can be read and is unsightly.

Other known containers have used paper or plastic labels that are secured to the exterior surfaces thereof by adhesive applied across the whole rear face of the label or have involved placing paper or a plastics sheet within a mould and in-moulding the sheet with the container during the fabricating of the container. However, it is difficult to automate the manufacture of such containers and application of an adhesive label involves applying heat or pressure to the whole surface of the label and this can damage the walls, e.g. the spine, of the container. Labeling via the in-moulding technique is also inflexible in production terms and capital intensive. If the product is over produced with respect to orders, the excess products have to be disposed of and, if the product is under produced with respect to orders, there is a significant delay in meeting the extra orders due to the time required to set up the moulding machinery again for a short production run.

A further problem with labels which are adhered to the outer surface of a container including a hinged portion is that the label is subject to distortion and damage when the container is opened and closed. If the label is adhered to the container when the container is in the open position, the label will be stressed across the hinged portion when the container is moved to the closed position and is liable to cracking or tearing. If the label is adhered to the container when the container is in the closed position, the label will tend to crease and unsightly lines form thereon when the container is moved to the open position. To overcome this problem, three separate labels have been provided, i.e. one on each of the major faces of the container and one on the spine thereof. However, this increases the manufacturing cost, is prone to error and can be unsightly.

It is an aim of the present invention to provide an improved container with an information display the manufacture of which is relatively simple and is easy to automate yet which provides a high quality durable information display.

SUMMARY OF THE INVENTION

Thus, according to a first aspect of the invention there is provided a container comprising a body portion having two sections connected to each other by a hinge portion, an information display member which includes an information layer formed as part of the member being secured by an adhesive or welded bond to one section of the body portion, extending across the hinge portion, with at least the majority thereof being unsecured to the hinge portion, and being secured by an adhesive or welded bond to the second section of the body portion.

According to another aspect of the invention, there is provided a method comprising steps of:

a) passing a sheet comprising a series of display members past optical sensing means, each display means having an associated optical marker;

b) halting the movement of the sheet when an optical marker is detected by the optical sensing means;

c) cutting a display member from the sheet; and d) applying the cut display member to a container and bonding it thereto; and repeating the above series of steps.

According to a further aspect, the invention provides a method of manufacturing a container as detailed above, in which adhesive is provided across a rear face of the information display member and then part of the adhesive in areas which, when the member is applied to the container, lie over the hinge portion and the parts of the first and second sections bordering the hinge portion is rendered non-adhesive prior to the member being affixed to the container. Alternatively, or additionally, the adhesive may be provided on the areas of the first and second section to which it is desired that the information member should adhere. Alternatively, or additionally, the hinge portion and the parts of the first and second section bordering the hinge portion are treated so as to prevent or inhibit the member adhering to the container in those areas.

Other features of the invention will be apparent from the following description and from the subsidiary claims of the specification.

BRIEF DESCRIPTION OF THE DRAWINGS

The invention will now be further described, merely by way of example, with reference to the accompanying drawings in which:-

BEST MODE OF INVENTION

Figure 1:
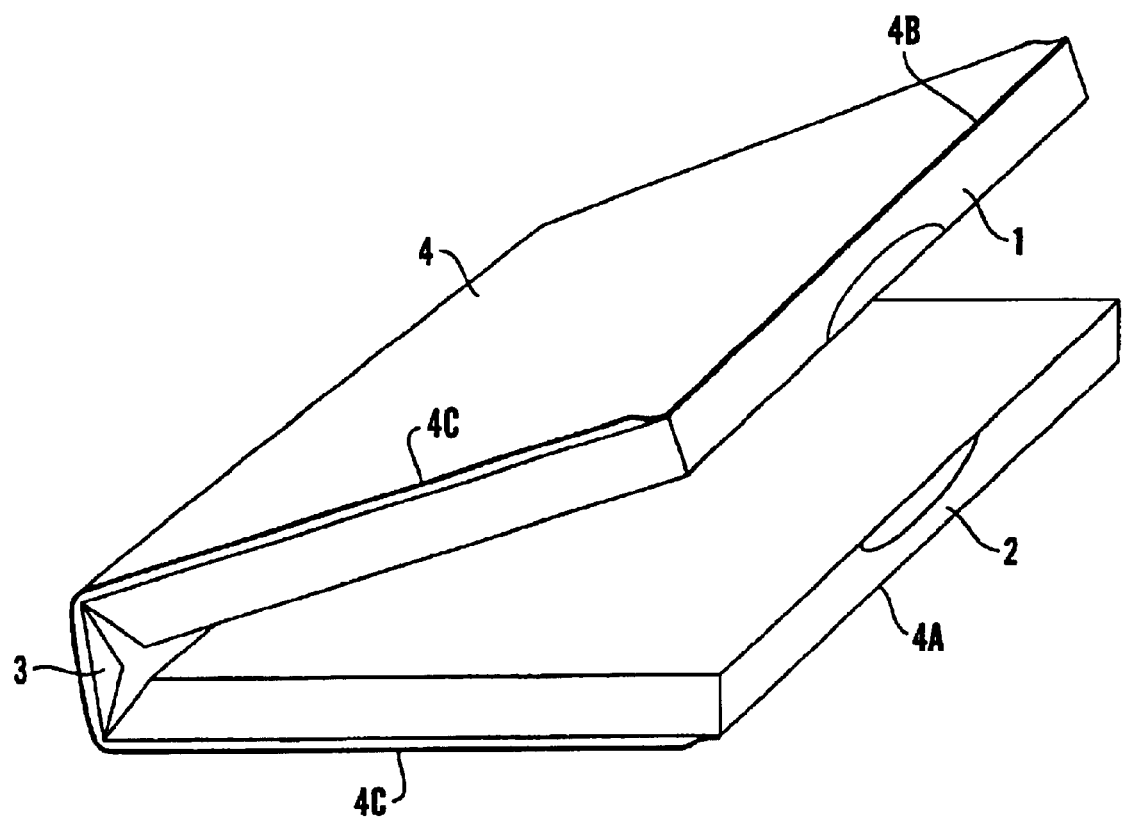
FIG. 1 shows a perspective view of a first embodiment of a container according to the present invention.

FIG. 1 shows a container formed of a plastics material, e.g. polypropylene. The container is preferably formed by injection moulding. Such containers are well-known for housing video-cassettes and are becoming well-known for housing CDs and DVDs.

The container comprises a body portion a first section 1 of which forms a base and a second section 2 of which forms a lid. The two sections are joined together by a hinge portion 3 either about a single hinge line or, more typically, via a pair of hinge lines with a spine part therebetween as shown in FIG. 1.

The interior wall or walls of the container are preferably provided with means (not shown) for releasably holding a video cassette, CD or DVD within the container the details of which are not relevant for the present description.

An information display member 4 is provided on the exterior of the container. This is secured at a first edge 4A thereof by an adhesive or welded bond to an edge of the base 1, extends around the hinge portion 3, but is not secured thereto, and is secured at a second edge 4B thereof to an edge of the lid 2.

Figure 3:
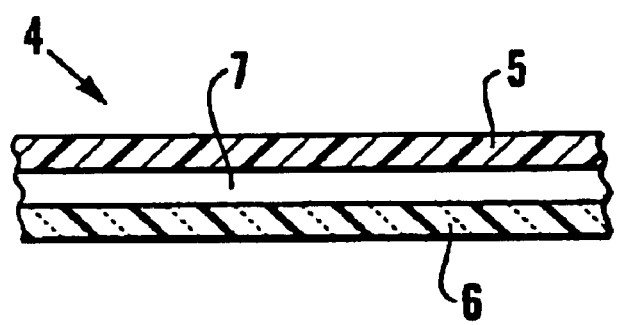
FIG. 3 shows an enlarged cross section through an information display member of the container shown in FIG. 2.

A preferred form of display member 4 comprises a laminate as shown in FIG. 3 comprising a backing layer 5 formed of a plastics material capable of being welded to the body portion. The backing layer 5 is preferably formed of the same type of plastics material as the body portion, e.g. polypropylene. The laminate also comprises a clear plastics outer layer 6, which may again be formed of polypropylene with an information layer 7, e.g. a printed sheet, sandwiched between the backing layer 5 and the outer layer 6. The outer layer 6 is secured to the backing layer 5 in a manner so as to hold the printed layer 7 in place and preferably prevent it from moving relative to the outer layers 5, 6. Preferably, the printed sheet 7 is of similar dimensions to the outer layer 6 and the outer layer 6 is secured to the backing layer 5 around the entire periphery thereof.

Figure 2:
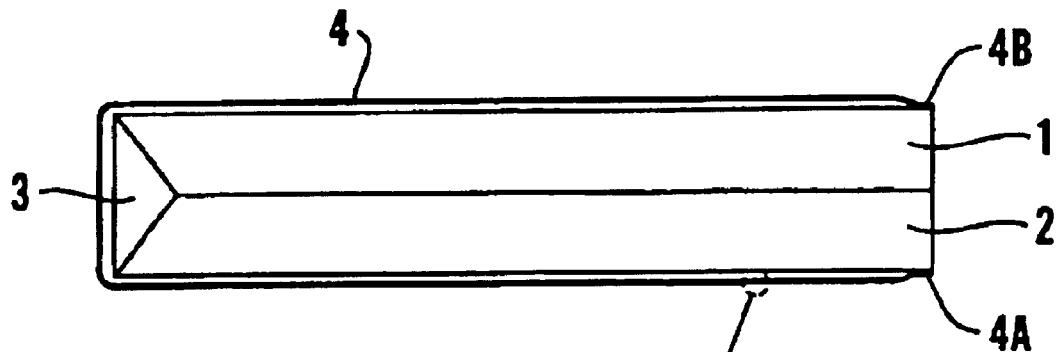
FIG. 2 is an end view of the container shown in FIG. 1.

The display member 4 shown in FIGS. 1 and 2 is secured to the body portion of the container in a similar manner to a conventional sleeve on a video box, i.e. by weld lines along opposite edges 4A, 4B thereof parallel to and remote from the spine part 3.

The arrangement described above has the advantage that the information sheet is fabricated as part of the display member 4 prior to securement of the display member 4 to the body portion. In some cases, however it may be desirable to assemble the body portion, backing layer 5, information sheet 7, and outer layer 6, together and weld the outer layer 6 to the body layer and the backing layer 5 to the body portion in situ.

The information sheet 7 is thus held captive between the backing layer 5 and outer layer 6 so cannot slip out or move out of place.

Figure 4:
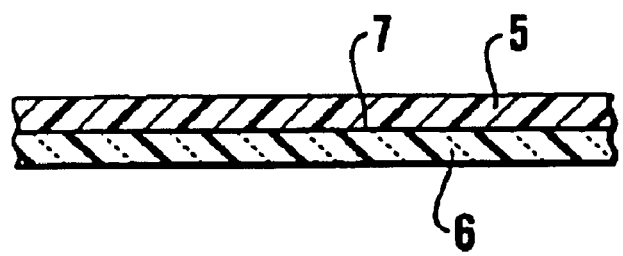
FIG. 4 shows a similar cross-section through an alternative form of information display member that may be used.

In an alternative arrangement illustrated in FIG. 4, the information layer may comprise a layer of print 7 sandwiched between the backing layer 5 and the outer layer 6, i.e. the layer of print is formed directly on the outer surface of the backing layer 5 and/or the inner surface of the outer layer 6 rather than on a separate sheet of paper or separate plastics film therebetween.

The outer layer 6 is still preferably provided to protect the layer of print from scratching or other damage although, in some applications, R is possible to omit the outer layer. In this case, the information member simply comprises the backing layer 5 with information printed directly on its outer surface and/or on its inner surface (if the backing layer is transparent). With such an arrangement it is preferred if the printed layer does not cover the areas of the backing layer 5 which are to be welded to the body portion otherwise the printed layer may interfere with the formation of a satisfactory welded bond and/or be rendered unsightly by the welding process.

The display member may also be arranged so that it displays information on both sides thereof, i.e. its external side visible from the exterior of the container and its internal side visible from the interior of the container through part of the body portion. In this case, at least part of the backing layer 5 needs to be transparent (if the facing information layer is provided between the backing layer 5 and the layer 6) or the inward facing information layer is provided on the inward facing surface of the backing layer 5. At least part of the body portion should also be transparent or have apertures therein so the inward facing information layer is visible through the body portion when the container is in the open position.

The information layer may comprise multiple layers between the backing layer 5 and the cover layer 6 and/or comprise multiple layers on different surfaces of the backing layer and/or cover layer.

A laminated form of display member is advantageous as it provides the member with strength in the areas where it is not affixed or bonded to the container.

The arrangement described above in which the display member 4 extends from the first surface of the container and around the spine to the rear of surface of the container is advantageous as the display member 4 may be dimensioned such that, when the container is in the closed position, the display member 4 is put under a slight tension, i.e. it is slightly stretched between the two weld lines 4A, 4B. This helps keep the display member 4, and hence the information layer, taught and not to become ruckled or unsightly. Furthermore, as the display member 4 is not secured to the hinge portion 3, it is free to flex away from the hinge portion 4 when the container is opened. The display member 4 is thus not subject to damage when the container is opened and closed.

Securement of the display member 4 solely at the edges 4A and 4B thereof also avoids the need to apply heat or pressure to other areas of the container in order to affix the display member and thus reduces the risk of damaging or distorting the container.

Formation of the information layer as part of the display member also avoids the need to provide a separate loose sheet carrying the information. This ensures the information layer cannot slip or become detached and simplifies the manufacture of containers carrying an information layer, e.g. containers for CDs, DVDs or video cassettes.

The display member 4 may be secured to the container by weld lines or localised welded regions in other locations so long as the part extending around the hinge portion is not secured so it is free to flex when the container is opened and be held taught when the container is closed.

Although it is preferred for the display member to be unsecured to the hinge portion, it is acceptable in some cases for it to be secured thereto in a localised area, e.g. along one edge of the display member. Thus, in a further embodiment, the display member is secured to the body portion along edges 4A and 4B at the end thereof and also along one edge 4C which extends from the first section 1, around the hinge portion 3 at one edge thereof, to the second section 2. With this embodiment, the display member 4 is free to flex away from the majority of the hinge portion 3 when the container is opened, it only being constrained at one end of the hinge portion (preferably at the bottom of the container). This reduces the stresses the display member 4 experiences when the container 4 is opened and closed to an acceptable level.

In a further embodiment, the display member may be secured to the container by adhesive bonds, preferably along the edges 4A and 4B as for the welded bonds described above. The adhesive used should preferably be a high strength adhesive cured, for example, by application of heat, ultra-violet light or pressure along the bond line.

The adhesive may be pre-installed along bond lines, e.g. in grooves, on the body portion so it is simply necessary to hold the display member in position against the body portion and cure the adhesive in order to secure the display member 4 to the body portion or the adhesive may be pre-installed along bond lines on the rear face of the display member (or on both the body portion and the display member 4). A contact adhesive may be used or an adhesive which chemically bonds with the body portion and the display member 4. The display member used in this embodiment may take any of the forms described above but other material, e.g. paper or metal foil, may be used as it is no longer necessary for the backing layer 5 and/or the cover 6 to be of a material similar to that from which the body portion is formed.

Figure 5:
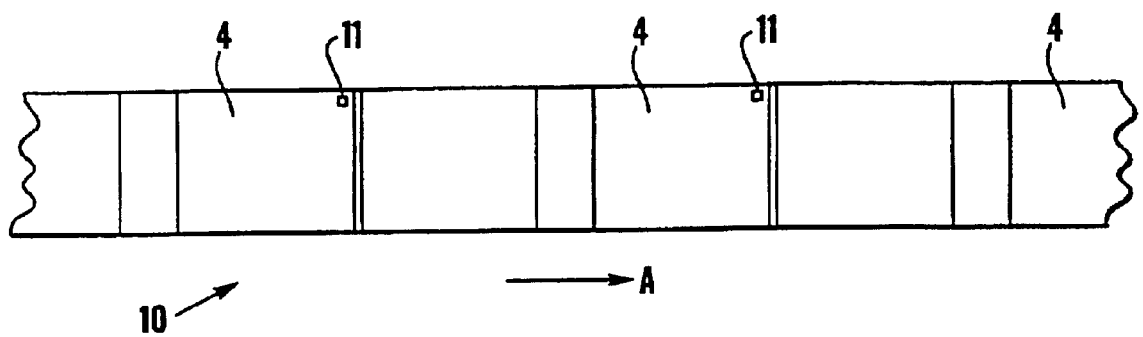
FIGS. 5 and 6 illustrate a method of manufacturing such a container.
Figure 6:
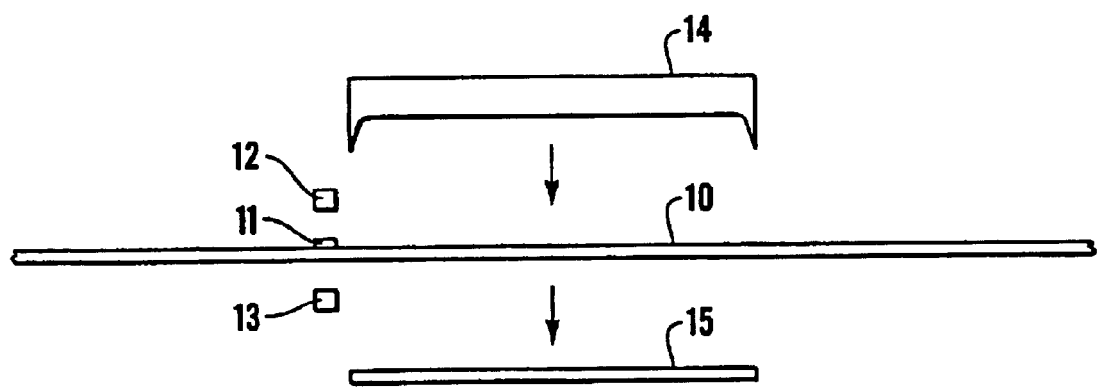

FIGS. 5 and 6 illustrate a method of applying the display member to a container.

FIG. 5 is a plan view of a sheet 10 comprising a series of preformed display members 4 moving in direction A Each display member is provided with an associated optical marker 11, e.g. a hole or a mark, so the sheet 10 has a series of optical markers at a uniform distance from each other, corresponding to the length of a display member 4, which can be used to sense the position of the sheet 10.

FIG. 6 is a side view showing the sheet 10 passing between an optical sensor comprising a light source 12, e.g. a laser or light emitting diode, and a light. detector 13. A cutter 14 is located above the sheet 10 and a container 15 for receiving a display member is located beneath the sheet 10.

When the optical sensor detects an optical marker 11, the sheet 10 is halted and the cutter 14 descends onto the sheet to cut a display member 4 therefrom and to guide this onto the container waiting beneath the sheet 10. The display member is then bonded to the container 15, e.g. by heating means, ultra violet light sources or pressure bars carried by the cutter 14, and the container 15 with display member 4 bonded thereto is removed and replaced by another container. The cutter 14 then returns to its initial position and the sheet is moved in the direction A again until the next optical marker 11 is sensed and the cycle repeated.

Figure 7:
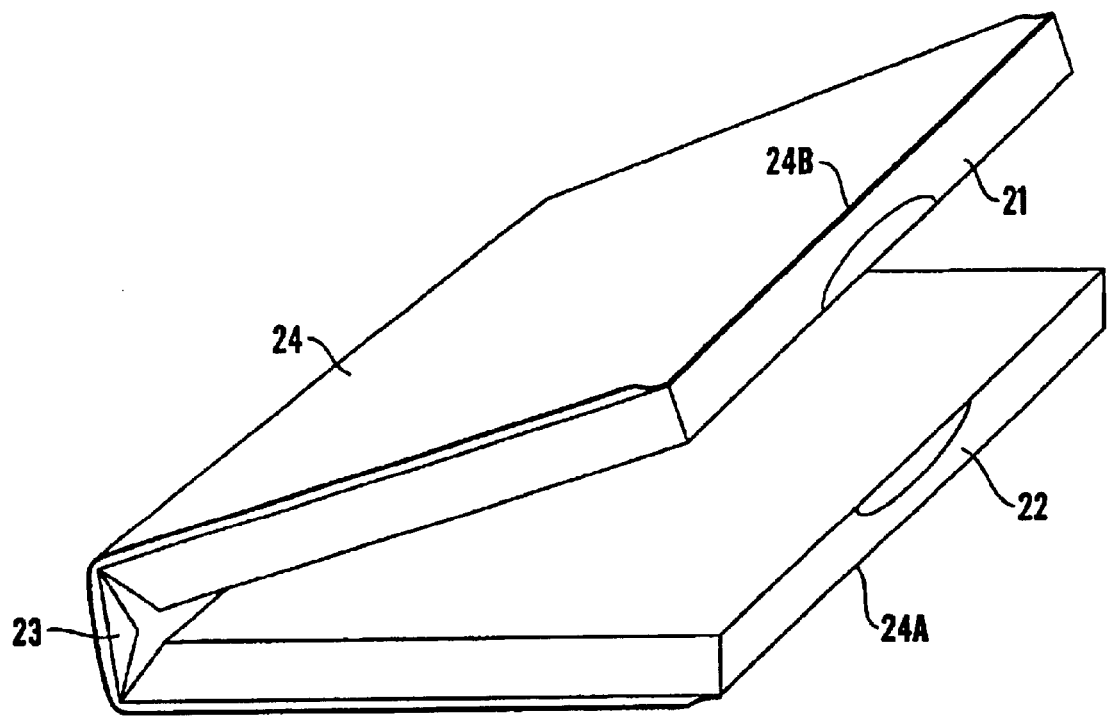
FIG. 7 shows a perspective view of another embodiment of a container according to the present invention.
Figure 8:
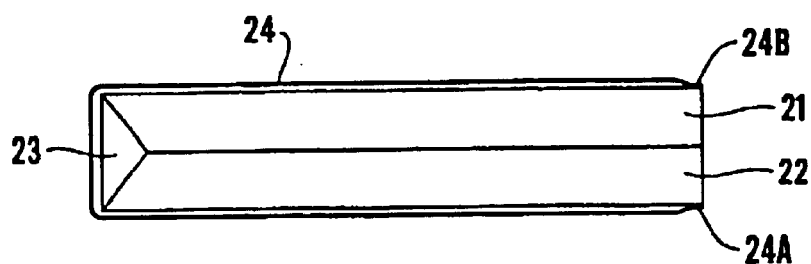
FIG. 8 is an end view of the container shown in FIG. 7.

FIG. 7 shows a container formed of a plastics material, e.g. polypropylene. The container is preferably formed by injection moulding.

As in the embodiments described above, the container comprises a body portion a first section 21 of which forms a base and a second section 22 of which forms a lid. The two sections are joined together by a hinge portion 23 either about a single hinge line or, more typically, via a pair of hinge lines with a spine part therebetween as shown in FIG. 7.

The interior wall or walls of the container are preferably provided with means (not shown) for releasably holding a video cassette, CD or DVD within the container the details of which are not relevant for the present description.

An information display member 24 is provided on the exterior of the container. This is secured to the first and second section 21 and 22, e.g. by adhesive or a welded bond, but is not secured to the hinge portion 23 or to parts of the first and second section bordering the hinge portion 23. Preferably, said parts extend a small distance away from the hinge portion e.g. by 0.5 to 3.0 cm, and preferably by 1.0 to 2.0 cm, away cm the hinge portion. Alternatively, the said parts are of a width such that at least two-thirds, and preferably at least three-quarters, of the width of the label from the edge of the hinge portion to the opposite edge 24B (or 24A) of the label is adhered to the first section.

Figure 9:
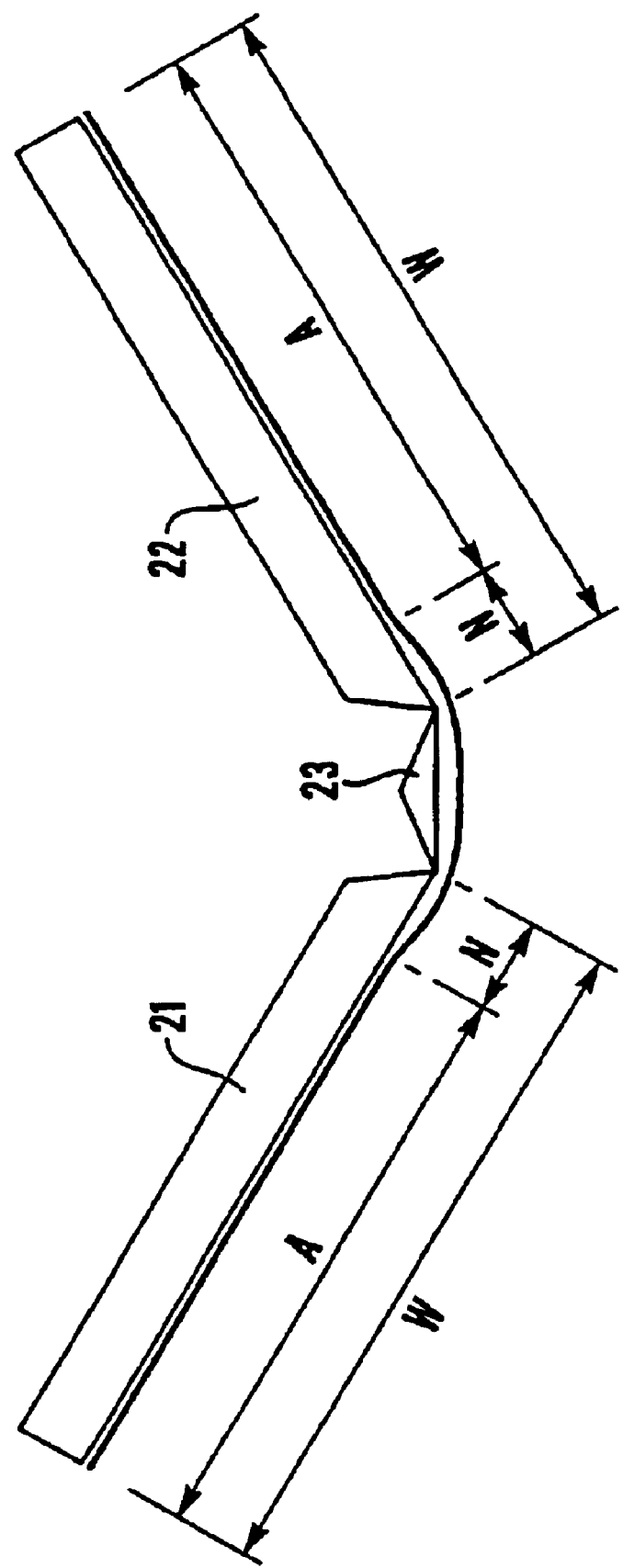
FIG. 9 shows an end view of the container in a partially opened position.

Such an arrangement is shown in FIG. 9 in which a display member in the form of a label 24 is adhered to the first and second sections 21 and 22 only over a length A of the total width W of each section, and not over a length N bordering the hinge portion 23. The label is also not adhered to the hinge portion 23. Thus, when the container is opened, the part of the label 24 extending across the hinge portion 23 is able to bow away from the container so R does not become creased. However, the majority of the label 24 is adhered to the container so is protected from damage and retains a smart appearance.

Such an arrangement can be manufactured in a variety of ways. Adhesive may be provide on the rear face of the label 24 and/or on the external faces of the container only in the areas where adhesion is required, i.e. excluding a band corresponding to the non-adhered areas N and the hinge portion 23. Alternatively adhesive may be provide across the whole of the rear face of the label 24 and/or across the whole of the external faces of the sections 21 and 22 and the label and or the container are then treated to prevent or inhibit adhesion in the non-adherence zones N and the hinge portion 23. This may, for instance, be done by neutralising a band of adhesive across the centre of the rear face of the label prior to it being mounted on the container and/or by rendering the non-adherence zones N and hinge portion 23 of the container non-adhesive, e.g. by the application of grease to these areas. A further way of achieving this is to adhere a further strip of material, e.g. paper, across the centre of the rear face of the label so as to cover the adhesive in this area. This has the advantage of reinforcing the portion of the label over the hinge portion and the bordering areas of the first and second sections.

The display member 24 preferably comprises a paper or plastics label provided with adhesive across its rear face. The adhesive is preferably provided in a continuous manner across the rear face but could be provided as a matrix of closely spaced dots across the rear face.

The display member 24 may also be of any of the forms described in relation to FIGS. 1–6.

The display member may be arranged so that it displays information on both sides thereof, i.e. its external side visible from the exterior of the container and its internal side visible from the interior of the container through part of the body portion. At least part of the body portion should also be transparent or have apertures therein so the inward facing information layer is visible through the body portion when the container is in the open position.

As mentioned, the arrangement described is advantageous as the display member 24 may be dimensioned such that, when the container is in the closed position, the display member 24 is put under a slight tension across the hinge portion 23, i.e. it is slightly stretched between the areas where it is adhered to the first and second sections. This helps keep the display member 24 taught and not to become ruckled or unsightly. Furthermore, as the display member 24 is not secured to the hinge portion 23, it is free to flex away from the hinge portion 24 when the container is opened. The display member 24 is thus not subject to damage when the container is opened and closed.

The display member 24 may be secured to the container by any suitable means so long as the part extending around the hinge portion is not secured so it is free to flex away from the container when the container is opened and be held taught when the container is closed. However, adhesive bonding is the easiest way of attaching the display member to the container so is preferred.

The adhesive used may be a high strength adhesive cured, for example, by application of heat, ultra-violet light or pressure.

The adhesive may be preinstalled on the container so it is simply necessary to hold the display member in position against the body portion and cure the adhesive in order to secure the display member 24 to the body portion or the adhesive may be pre-installed on the rear face of the display member (or on both the body portion and the display member 24). A contact adhesive may be used or an adhesive which chemically bonds with the body portion and the display member 24. The display member used may take any of the forms described above but other material, e.g. metal foil, may be used.

Thus, the above-mentioned products provide containers with a display member or label which can be quickly and efficiently manufactured by a simple, automated process that is relatively inexpensive to operate yet which provides an attractive and robust display. The capital investment for the machinery involved is also low, since only minor modifications of known machinery will usually be required.

In another version of the invention, a display member of the type described above is welded to a plastics container but, in this case, the display means may be provided on a single face of the container (or a separate display member provided on each face thereof). Again, the display member is pre-formed with an information layer being part of the display member and part of the display member, e.g. at least the backing layer, but preferably also the cover layer (if present), is formed of a plastics material which can be welded in localised areas, e.g. along opposite edges of the display member, to the container. The need to provide a separate sheet carrying information is thus again avoided and display members can be easily secured to containers by an automated process similar to that described above.

What is claimed is:

1. A container comprising a body portion having two sections connected to each other by a hinge portion, an information display member which includes an information layer formed as part of the member being secured by an adhesive or welded bond along a first edge thereof remote from and parallel to the hinge portion to one section of the body portion, extending across the hinge portion, and being secured by an adhesive or welded bond along a second edge thereof remote from and parallel to the hinge portion to the second section of the body portion, with at least the majority of the member being unsecured to the hinge portion, and with at least one of third and fourth edges of the display member, which join the first and second edges thereof, being unsecured to the hinge portion or to parts of the first and second sections bordering the hinge portion.

2. A container as claimed in claim 1, in which the display member is formed of a laminate comprising a backing layer, a cover layer and an information layer therebetween.

3. A container as claimed in claim 2 in which the information layer comprises information printed directly onto the backing layer and/or the cover layer.

4. A container as claimed in claim 2 in which at least one of the backing layer and the cover layer is formed of polypropylene.

5. A container as claimed in claim 1 in which the information display member is secured to the body portion by adhesive bonds extending across a substantial area of major faces of the first and second sections of the body portion.

6. A container as claimed in claim 5 in which the information display member is not secured to the hinge portion or to parts of the first and second sections bordering the hinge portion.

7. A container as claimed in claim 1 in which said third edge of the information display member extending from one section of the body portion, across the hinge portion to the second section of the body portion, is secured to the body portion, whereas the fourth edge thereof is not secured to said one section, said second section or to the hinge portion.

8. A container as claimed in claim 1 in which the display member comprises a backing layer with an information layer printed on one of both surfaces thereof.

9. A container as claimed in claim 1 in which the information display member displays information on both sides thereof, one side being visible on the outer surface in the container and the other side thereof being visible from the interior of the container through part of the body portion.

10. A container as claimed in claim 1 having releasable engagement means therein for releasably holding a CD, DVD or video cassette within the container.

11. A container as claimed in claim 1 in which the body portion is formed by an injection molding process.

12. A container as claimed in claim 1, which is formed of polypropylene.

13. A container as claimed in claim 6 in which adhesive is provided over the major faces of the first and second sections of the body portion and over the hinge portion and a strip of material or of grease is provided over the hinge portion and the parts of the first and second sections bordering the hinge portion so as to prevent or inhibit the information display member from adhering to the container in that area.

14. A method of manufacturing a container as claimed in claim 1, comprising the steps of:
   a) passing a sheet comprising a series of display members past optical sensing means, each display member having an associated optical marker;
   b) halting the movement of the sheet when an optical marker is detected by the optical sensing means;
   c) cutting a display member from the sheet; and
   d) applying the cut display member to a container and bonding it thereto; and repeating the above series of steps.

15. A method of manufacturing a container as claimed in claim 6 wherein adhesive is provided across a rear face of the information display member and then part of the adhesive in areas which, when the member is applied to the container, lie over the hinge portion and the parts of the first and second sections bordering the hinge portion is rendered non-adhesive prior to the member being affixed to the container.

16. A method as claimed in claim 15 in which the adhesive is provided only on areas of the first and second section to which it is desired that the information member should adhere.

17. A method as claimed in claim 15 in which the hinge portion and the parts of the first and second sections bordering the hinge portion are treated so as to prevent or inhibit the member adhering to the container in those areas.

* * * * *